(12) United States Patent
Contreras et al.

(10) Patent No.: US 8,174,788 B2
(45) Date of Patent: May 8, 2012

(54) MOTOR MOUNT FOR INTERFERENCE SUPPRESSION IN A HARD DISK DRIVE

(75) Inventors: John Contreras, Palo Alto, CA (US); Klaas B. Klaassen, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 661 days.

(21) Appl. No.: 12/011,716

(22) Filed: Jan. 28, 2008

(65) Prior Publication Data

US 2009/0190253 A1     Jul. 30, 2009

(51) Int. Cl.
*G11B 17/02*     (2006.01)
(52) U.S. Cl. .................................................. 360/99.08
(58) Field of Classification Search ................ 360/99.08
See application file for complete search history.

(56) References Cited

U.S. PATENT DOCUMENTS

| | | | |
|---|---|---|---|
| 5,673,159 | A | 9/1997 | Jinbo et al. |
| 5,729,404 | A | 3/1998 | Dunfield et al. |
| 5,920,539 | A | 7/1999 | Schell et al. |
| 6,339,515 | B2 | 1/2002 | Lee et al. |
| 6,512,654 | B2 * | 1/2003 | Teshima ..................... 360/99.08 |
| 6,686,673 | B1 | 2/2004 | Komura et al. |
| 6,844,642 | B2 | 1/2005 | Tashiro |
| 6,940,193 | B2 * | 9/2005 | Hoffmann et al. .......... 310/67 R |
| 7,088,023 | B1 * | 8/2006 | Gomyo et al. ................... 310/90 |
| 2002/0030926 | A1 * | 3/2002 | Teshima ..................... 360/99.08 |
| 2005/0135011 | A1 | 6/2005 | Jang et al. |
| 2006/0215312 | A1 * | 9/2006 | Sumi et al. ................. 360/99.08 |

FOREIGN PATENT DOCUMENTS

| | | |
|---|---|---|
| EP | 1544849 | 6/2005 |
| JP | 2000082252 | 3/2000 |

OTHER PUBLICATIONS

Jabbar, M. A., "Disk Drive Spindle Motors and Their Controls", *IEEE Transaction on Industrial Electronics*, vol. 43, No. 2, (Apr. 1996),276-284.
Son, et al., "The Acoustic Noise Characteristics of HDD Due to the Structural Excitation of Spindle Motor", IEEE, (2000),1-2.
Bi, et al., "Reduction of Acoustic Noise in FDB Spindle Motors by Using Drive Technology", *IEEE Transactions on Magnetics*, vol. 39, No. 2, (Mar. 2003), 800-805.

* cited by examiner

*Primary Examiner* — David D Davis

(57) ABSTRACT

A method for manufacturing a hard disk drive is described. The method includes providing a motor assembly, the motor assembly comprising a stationary portion and a rotatable portion for rotating a magnetic disk with respect to said stationary portion and providing a base for receiving the motor assembly. The method further includes providing an adhesive for mounting the motor assembly to said base wherein the adhesive is electrically conductive and mounting the stationary portion of the motor assembly to the base utilizing the adhesive such that the adhesive provides a low resistance path between the base and the motor assembly.

15 Claims, 5 Drawing Sheets

400

```
┌─────────────────────────────────────────┐
│ Providing a motor assembly, the motor   │
│ assembly comprising a stationary        │
│ portion and a rotatable portion for     │
│ rotating a magnetic disk with respect   │
│ to the stationary portion               │
│                 402                     │
└─────────────────────────────────────────┘
                    │
                    ▼
┌─────────────────────────────────────────┐
│ Providing a base for receiving the      │
│ motor assembly                          │
│                 404                     │
└─────────────────────────────────────────┘
                    │
                    ▼
┌─────────────────────────────────────────┐
│ Providing an adhesive for mounting the  │
│ motor assembly to the base wherein the  │
│ adhesive is electrically conductive     │
│                 406                     │
└─────────────────────────────────────────┘
                    │
                    ▼
┌─────────────────────────────────────────┐
│ Mounting the stationary portion of the  │
│ motor assembly to the base utilizing    │
│ the adhesive such that the adhesive     │
│ provides a low resistance path between  │
│ the base and the motor assembly         │
│                 408                     │
└─────────────────────────────────────────┘
```

MOTOR MOUNT FOR INTERFERENCE SUPPRESSION IN A HARD DISK DRIVE

TECHNICAL FIELD

This invention relates generally to the field of direct access storage devices and in particular to resolving interference problems associated with motor mounts of disk drives.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

One problem with current HDD assemblies is that interference signals can be conducted through the metal disk drive enclosure. Interference signals can come from any number of sources, including wireless communication signals. These interference signals can be transferred through the HDD when there is a significant amount of resistance between different disk drive components. In some cases, the interference signals can have a negative impact on the performance of the HDD.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for manufacturing a hard disk drive is described. The method includes providing a motor assembly, the motor assembly comprising a stationary portion and a rotatable portion for rotating a magnetic disk with respect to said stationary portion and providing a base for receiving the motor assembly. The method further includes providing an adhesive for mounting the motor assembly to said base wherein the adhesive is electrically conductive and mounting the stationary portion of the motor assembly to the base utilizing the adhesive such that the adhesive provides a low resistance path between the base and the motor assembly.

BRIEF DESCRIPTION OF THE DRAWINGS

FIG. 4 is a flow diagram of an exemplary disk drive manufacturing method in accordance with embodiments of the present invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a HDD and components connected therewith. The discussion will then focus on embodiments of a method and system for reducing interference in a disk drive system. In one embodiment of the invention, a high conductive adhesive is used to couple a motor mount assembly to the case portion of the disk drive. The high conductive adhesive provides a low resistance path between the motor assembly and the case which suppresses interference signals within the disk drive assembly. In another embodiment, a high conductive bearing seal is used to seal a fluid dynamic bearing. The high conductive seal contacts the motor assembly and the motor assembly and provides a low resistance path between the motor assembly and the case which suppresses interference signals within the disk drive assembly.

Overview

In general, the present technology suppresses interference signals in a hard disk drive. Interference signals can be conducted through a disk drive metal enclosure. These interference signals can be transferred through the sensitive front end when there is significant amount of resistance between different components of the hard disk drive, such as the motor mount between the motor and the case. High resistance between components can be a major contributor to interference pick-up through the front end of the disk drive system.

In particular, embodiments of the present invention provide a high conductive path between the motor and the case, thus lowering the resistance between components of the disk drive. In one embodiment, a high conductive adhesive is used to mount the motor assembly to the case. In another embodiment, a high conductive bearing cap is used to provide a high conductive path between the case and the motor assembly. Moreover, the described benefits are realized with minimal modification to the overall HDD manufacturing process in general and to the motor assembly and base HDD structure in particular.

Operation

Figure 1:
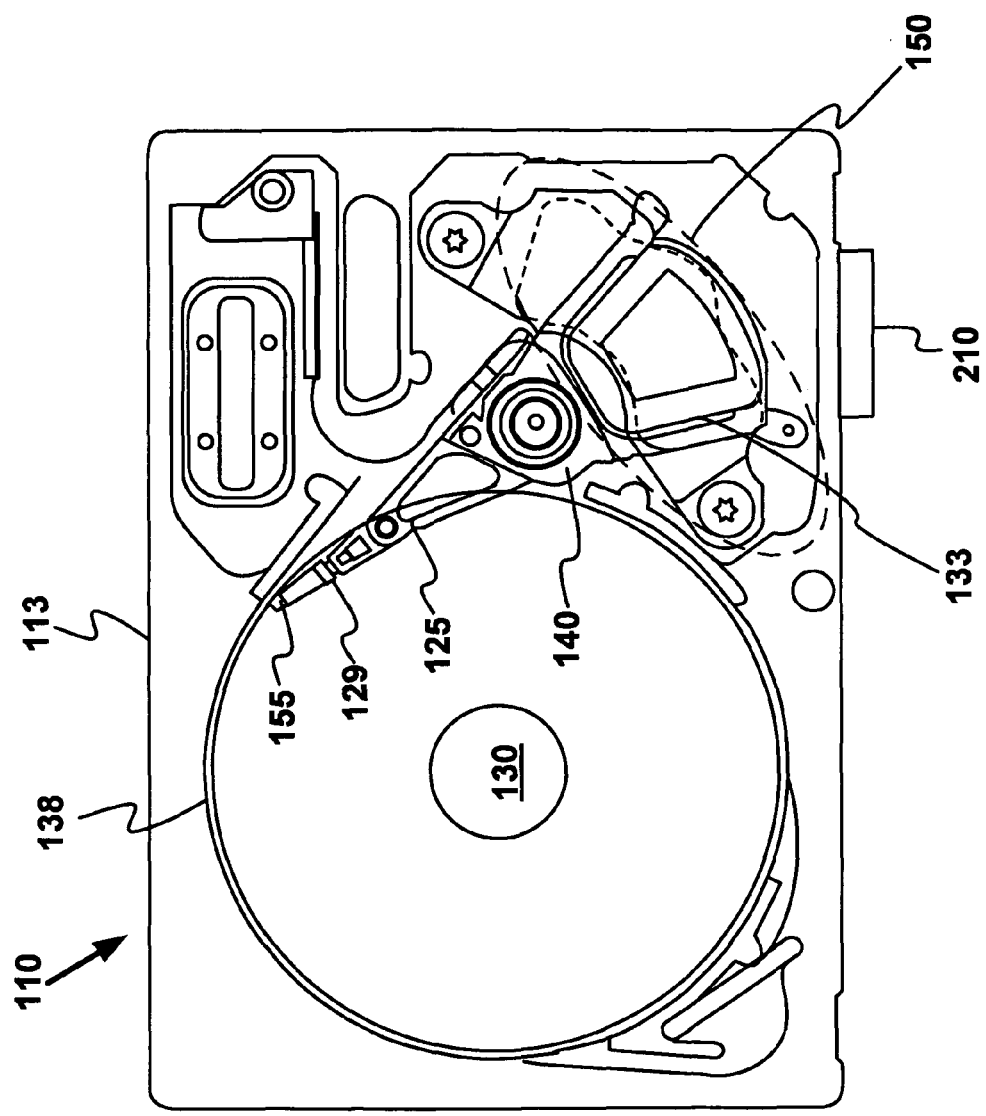
FIG. 1 is a plan view of an HDD with cover and top magnet removed in accordance with one embodiment of the present invention.

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. In one embodiment, the drive hub 130 is coupled with the housing 113 with a high conductive adhesive (not shown). An actuator assembly 140 includes one or more actuator arms 125. When a number of actuator arms 125 are present, they are usually represented in the form of a comb that is movably or pivotally mounted to base/housing 113. A controller 150 is also mounted to base 113 for selectively moving the actuator arms 125 relative to the disk 138. Actuator assembly 140 may be coupled with a connector assembly 210, which is utilized to convey data between arm electronics and a host system, such as a computer, wherein HDD 110 resides. In one embodiment of the invention, the exemplary high conductive adhesive is used to suppress interference signals inside the disk drive 110 by providing a low resistance path between the drive hub 130 and the housing 113.

In one embodiment, each arm 125 has extending from it at least one cantilevered integrated lead suspension (ILS) 129. The ILS 129 may be any form of lead suspension that can be used in a data access storage device. The slider 155 is usually bonded to the end of ILS 129. The level of integration containing the slider 155, ILS 129, and read/write head is called the Head Gimbal Assembly (HGA). In one embodiment of the invention, the exemplary high conductive adhesive suppresses interference signals from the ILS by providing a low resistance path between the drive hub 130 and the housing 113.

The ILS 129 has a spring-like quality, which biases or presses the air-bearing surface of slider 155 against disk 138 to cause slider 155 to fly at a precise distance from disk 138. ILS 129 has a hinge area that provides for the spring-like quality, and a flexing interconnect that supports read and write traces and electrical connections through the hinge area. A voice coil 133, free to move within a conventional voice coil motor magnet assembly is also mounted to actuator arms 125 opposite the head gimbal assemblies. Movement of the actuator assembly 140 by controller 150 causes the head gimbal assembly to move along radial arcs across tracks on the surface of disk 138.

In general, interference signals are propagated through the various components of the hard disk drive at locations where there is a high electrical resistance between components. To reduce the propagation of these interference signals, embodiments of the present invention use a high conductive adhesive to couple the motor assembly to the enclosure. The high conductive adhesive greatly improves electrical conductivity between the motor assembly and the enclosure, thus suppressing the interference signals. In another embodiment, a high conductive bearing seal is used in place or in conjunction with the high conductive adhesive to improve electrical conductivity between the motor assembly and the enclosure.

Figure 2A:
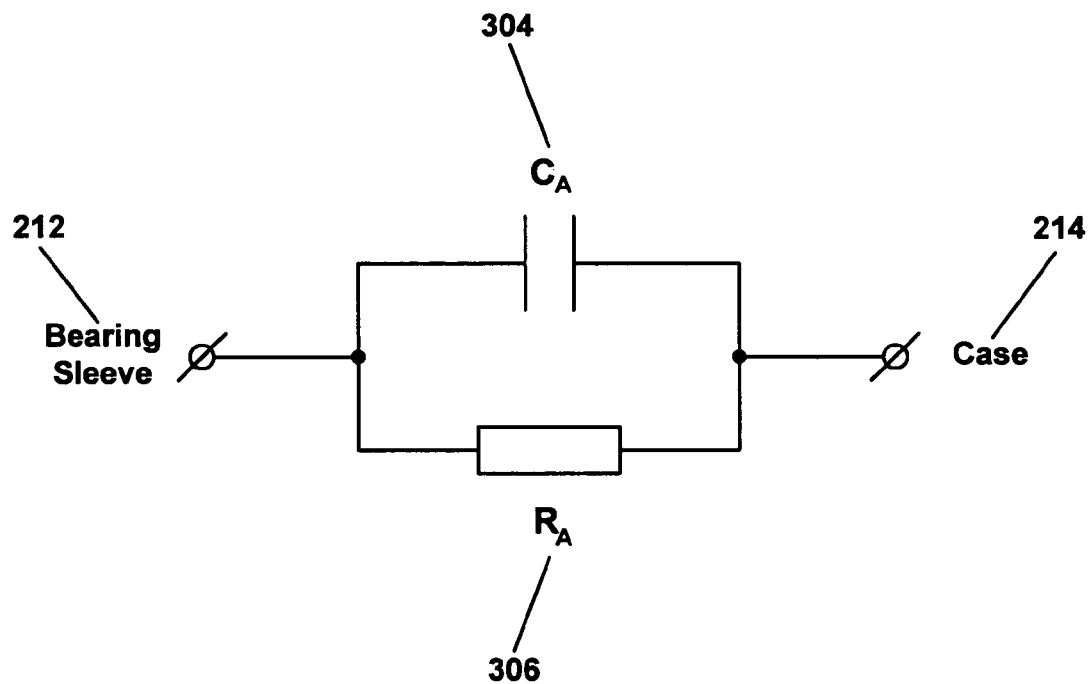
FIG. 2A is a circuit diagram showing resistance of a motor mount in accordance with one embodiment of the present invention.

FIG. 2A is a circuit diagram showing parasitic capacitive element 304 of a motor mount and the parasitic resistance 306 of the motor mount. In one embodiment, the capacitive element 304 and the parasitic resistance 306 are measured between the bearing sleeve 212 of a motor assembly and the case 214 of a hard disk drive.

Embodiments of the present invention use a high conductive adhesive between the bearing sleeve 212 and the case 214 to reduce the parasitic resistance 306 and the capacitive element 304. In another embodiment, a high conductive bearing seal is used to reduce the parasitic resistance 306 and the capacitive element 304. Reducing the parasitic resistance 306 and the capacitive element 304 suppresses interference signals in the hard disk drive assembly. In one embodiment, the parasitic resistance 306 is less than 100 Ohms when using the high conductive adhesive and/or the high conductive bearing seal of the present invention.

Figure 2B:
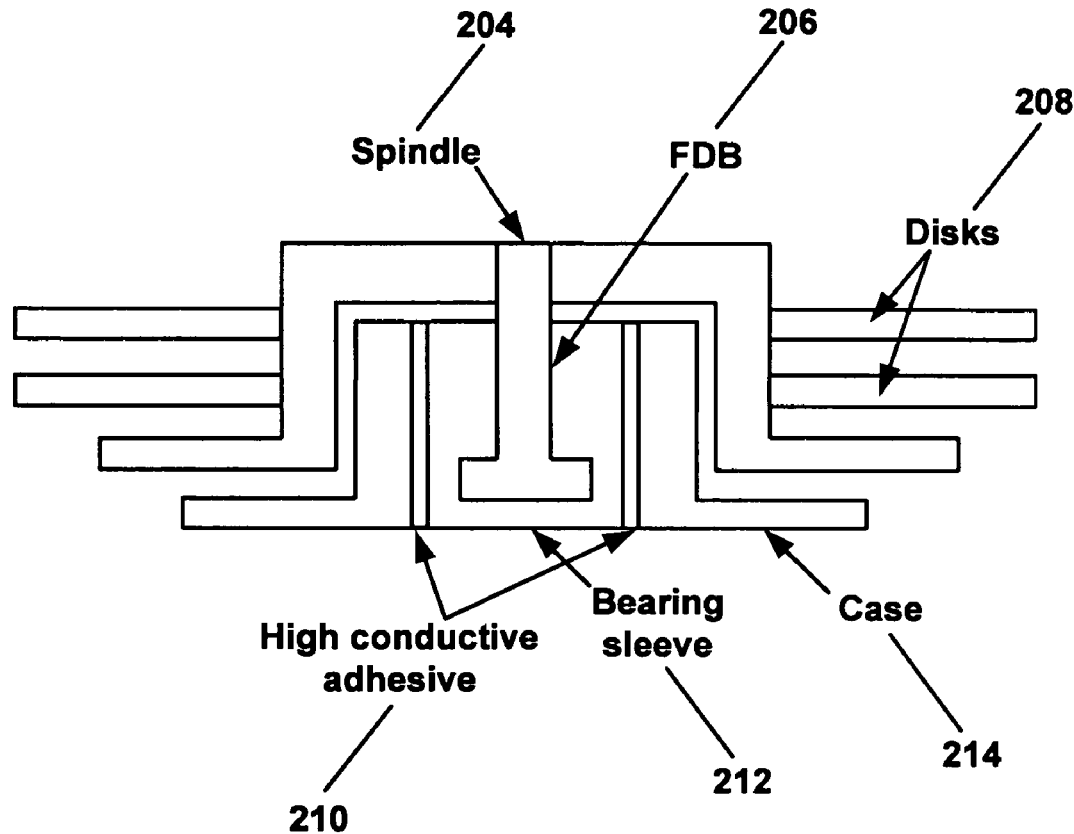
FIG. 2B is a side view of an exemplary high conductive adhesive coupling a base with a motor assembly of a hard disk drive in accordance with one embodiment of the present invention.

FIG. 2B is a side view illustration of an exemplary system 200 for reducing parasitic resistance in a hard disk drive assembly in accordance with embodiments of the present invention. System 200 utilizes a high conductive adhesive 210 to couple a bearing sleeve of a motor assembly to a case 214. In one embodiment, the high conductive adhesive 210 is applied to surfaces of the bearing sleeve 212 that are parallel to the axis of rotation defined by spindle 204. However, it is appreciated that the high conductive adhesive could be applied to any surface of the stationary portion of the motor assembly, for example, on surfaces that are perpendicular to the axis of rotation defined by spindle 204.

In one embodiment, the motor assembly includes a fluid dynamic bearing 206 which includes a spindle portion 204 and a bearing sleeve portion 212. It is appreciated that the bearing sleeve is the stationary portion of the fluid dynamic bearing 206 and the spindle portion 204 rotates the disks 208 with respect to the bearing sleeve 212 (stationary portion). It is appreciated that the high conductive adhesive 210 could be used to couple any portions of the hard disk drive assembly where a high conductive path is desired. In one embodiment, the conductive path has a resistance of less than 100 Ohms.

Figure 3:
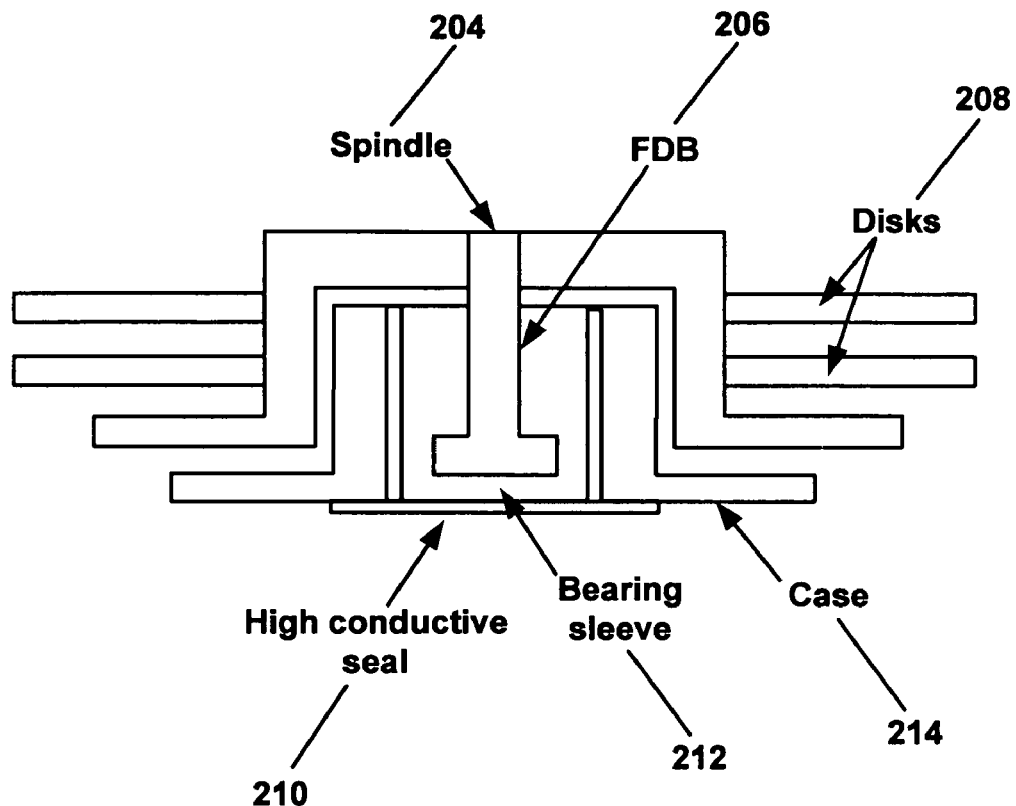
FIG. 3 is a side view of an exemplary high conductive bearing seal in accordance with one embodiment of the present invention.

FIG. 3 is a side view illustration of an exemplary system 300 for reducing parasitic resistance in a hard disk drive assembly in accordance with embodiments of the present invention. System 300 utilizes a high conductive seal 410 to provide a high conductive and low resistance path between a motor assembly and the case 214. In one embodiment, the motor assembly includes a fluid dynamic bearing 206 which includes a spindle portion 204 and a bearing sleeve portion 212.

It is appreciated that the bearing sleeve is the stationary portion of the fluid dynamic bearing 206 and the spindle portion 204 rotates the disks 208 with respect to the bearing sleeve 212 (stationary portion). In one embodiment, the high conductive seal serve the double purpose of sealing the fluid dynamic bearing 206 and simultaneously providing a low resistance path between the bearing sleeve 212 and the case 214. The high conductive path reduces interference in the hard disk drive assembly. In one embodiment, the high conductive seal has a resistance of less than 100 Ohms.

FIG. 4 is a flow diagram of an exemplary method 400 for manufacturing a hard disk drive in accordance with embodiments of the present invention. At 402, method 400 includes providing a motor assembly comprising a stationary portion and a rotatable portion for rotating a magnetic disk with respect to the stationary portion. In one embodiment, the motor assembly includes a fluid dynamic bearing. It is appreciated that the stationary portion gas been described as a bearing sleeve. However, it is appreciated that the stationary portion could be any portion of the motor assembly that remains stationary with respect to the rotation of the magnetic disk.

At 404, method 400 includes providing a base for receiving the motor. In one embodiment, the case portion includes a predetermined location for mounting the motor assembly and may have pre-configured features for enabling mounting of the motor assembly to the base using a high conductive adhesive.

At 406, method 400 includes providing an adhesive for mounting the motor assembly to the base wherein the adhesive is electrically conductive. In one embodiment, the adhesive has an electrical resistance of less than 100 Ohms.

At 408, method 400 includes mounting the stationary portion of the motor assembly to the base utilizing the adhesive such that the adhesive provides a low resistance path between the motor assembly and the case. In one embodiment, the low resistance path has a resistance of less than 100 Ohms.

In one embodiment, the high conductive adhesive can be used to rigidly couple the motor assembly to the case. In one embodiment, the high conductive adhesive is pre-applied to either the case or the stationary portion of the motor assembly prior to the mounting performed in 408.

Thus, embodiments of the present invention provide a method and apparatus for reducing interference signals in a disk drive assembly. Furthermore, embodiments described herein provide a high conductive adhesive for decreasing the resistance between the motor assembly and the enclosure, thus providing a high conductive path between the enclosure and the motor assembly. In addition, a high conductive bearing seal is provided for decreasing the resistance between the motor assembly and the enclosure, thus providing a high conductive path between the enclosure and the motor assembly. In addition, the benefits described herein are realized with minimal modification to the overall HDD manufacturing process.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for manufacturing a hard disk drive comprising:
    providing a motor assembly, said motor assembly comprising a stationary portion and a rotatable portion for rotating a magnetic disk with respect to said stationary portion;
    providing a base for receiving said motor assembly;
    providing an adhesive for mounting said motor assembly to said base wherein said adhesive is electrically conductive;
    providing a fluid dynamic portion of said motor assembly comprising a spindle portion and a bearing sleeve portion wherein a fluid is sealed between said sleeve portion and said spindle portion by said adhesive, said adhesive disposed along a horizontal surface of said base and said adhesive disposed along a horizontal surface of said sleeve portion to seal said fluid in said motor; and
    mounting said stationary portion of said motor assembly to said base utilizing said adhesive such that said adhesive provides a low resistance path between said base and said motor assembly such that said adhesive simultaneously provides a low resistance path between said sleeve portion of said fluid dynamic bearing and said base and said adhesive seals said fluid dynamic bearing.

2. The method of claim 1 wherein said adhesive rigidly couples said motor assembly to said base.

3. The method of claim 1 wherein said adhesive is provided to said bearing sleeve of said motor assembly prior to said mounting.

4. The method of claim 1 wherein said adhesive is provided to said base prior to said mounting.

5. The method of claim 1 wherein said adhesive reduces parasitic resistance between said base and said motor assembly.

6. A disk drive assembly comprising:
    a motor assembly comprising a stationary portion and a rotatable portion for rotating a magnetic disk along an axis of rotation with respect to said stationary portion;
    an adhesive for mounting said stationary portion to a base wherein said adhesive is electrically conductive and provides a high conductive path between said base and said motor assembly;
    a fluid dynamic portion of said motor assembly comprising a spindle portion and a bearing sleeve portion wherein a fluid is sealed between said sleeve portion and said spindle portion by said adhesive such that said adhesive simultaneously provides a low resistance path between said sleeve portion of said fluid dynamic bearing and said base and said adhesive seals said fluid dynamic portion, said adhesive disposed along a horizontal surface of said base and said adhesive disposed along a horizontal surface of said sleeve portion to seal said fluid in said motor assembly.

7. The disk drive assembly of claim 6 wherein said adhesive rigidly couples said motor assembly with said base.

8. The disk drive assembly of claim 6 wherein said stationary portion comprises said bearing sleeve.

9. The disk drive assembly of claim 6 wherein said adhesive is disposed on a surface of said motor assembly parallel to said axis of rotation.

10. The disk drive assembly of claim 6 wherein said adhesive is disposed on a surface of said motor assembly perpendicular to said axis of rotation.

11. The disk drive assembly of claim 6 wherein said adhesive reduces parasitic resistance between said motor assembly and said base.

12. A disk drive system comprising:
    a housing;
    a motor assembly coupled with said housing, said motor assembly comprising:
        a shaft having:
            an axis of rotation; and
            a surface for supporting a film of lubricating fluid;
        a hub having:
            an axis coincident to said axis of rotation; and
            a complimentary surface juxtaposed to said shaft which is conducive to supporting said lubricating fluid such that said shaft is rotatably retained; and
        an electrically conductive bearing seal coupled with said hub and coupled with said housing for sealing said lubrication fluid within said hub and for providing a high conductive path between said housing and said motor assembly, said electrically conductive bearing seal disposed along a horizontal surface of said housing and said electrically conductive bearing seal disposed along a horizontal surface of said hub to seal said fluid in said motor assembly.

13. The disk drive system of claim 12 wherein said motor assembly is coupled to said housing with an electrically conductive adhesive.

14. The disk drive system of claim 12 wherein said high conductive path is perpendicular to said axis of rotation.

15. The disk drive system of claim 12 wherein said bearing seal is coupled to a surface of said motor assembly perpendicular to said axis of rotation.

* * * * *